Nov. 21, 1950     W. B. TALLMAN     2,530,668
WINDROWER LEVELING MEANS

Filed June 14, 1946     5 Sheets-Sheet 1

Inventor:
William B. Tallman,
By Soans, Pond & Anderson
Attorneys.

Nov. 21, 1950 W. B. TALLMAN 2,530,668
WINDROWER LEVELING MEANS
Filed June 14, 1946 5 Sheets-Sheet 3

Inventor:
William B. Tallman,
By Soans, Pond & Anderson
Attorneys.

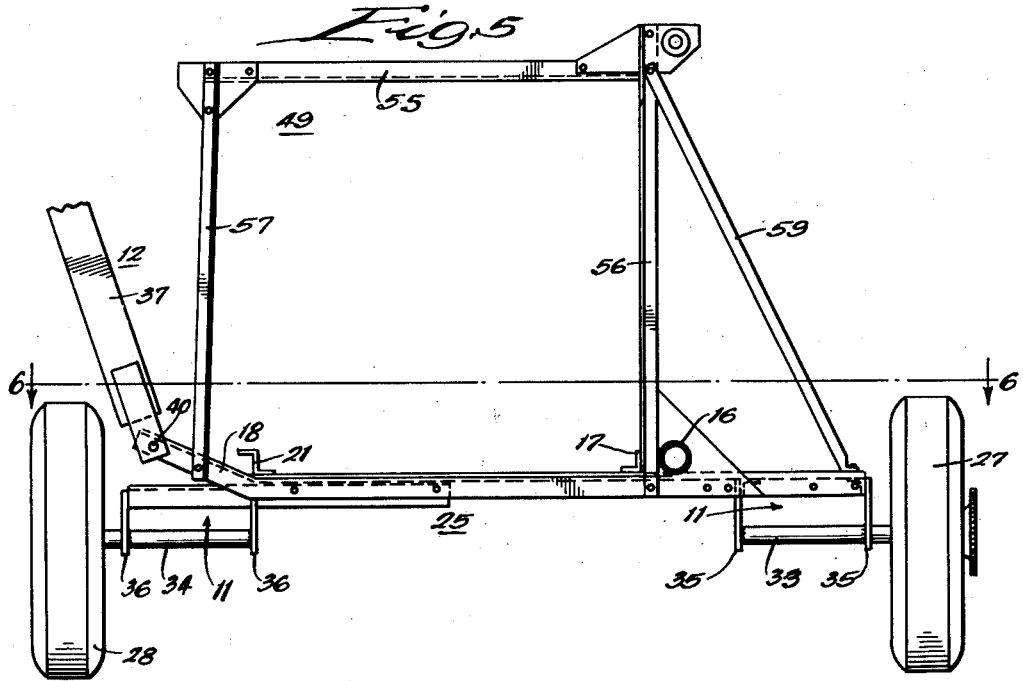
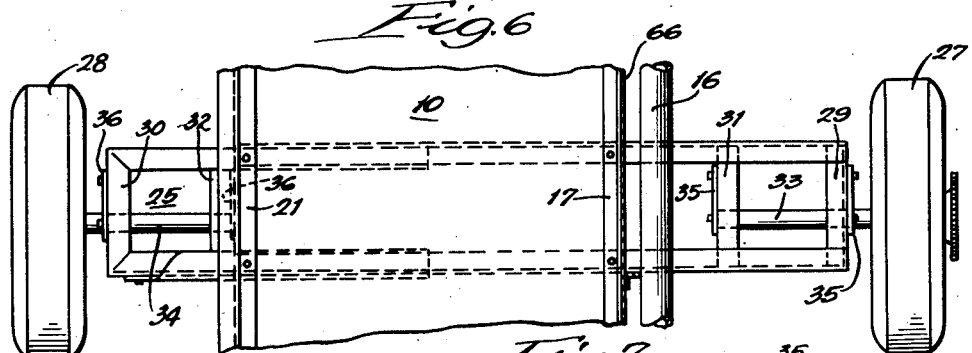
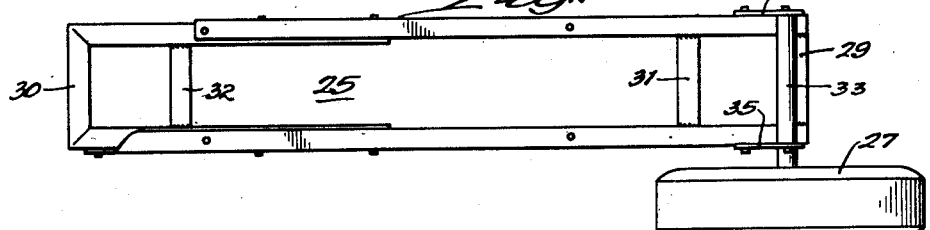

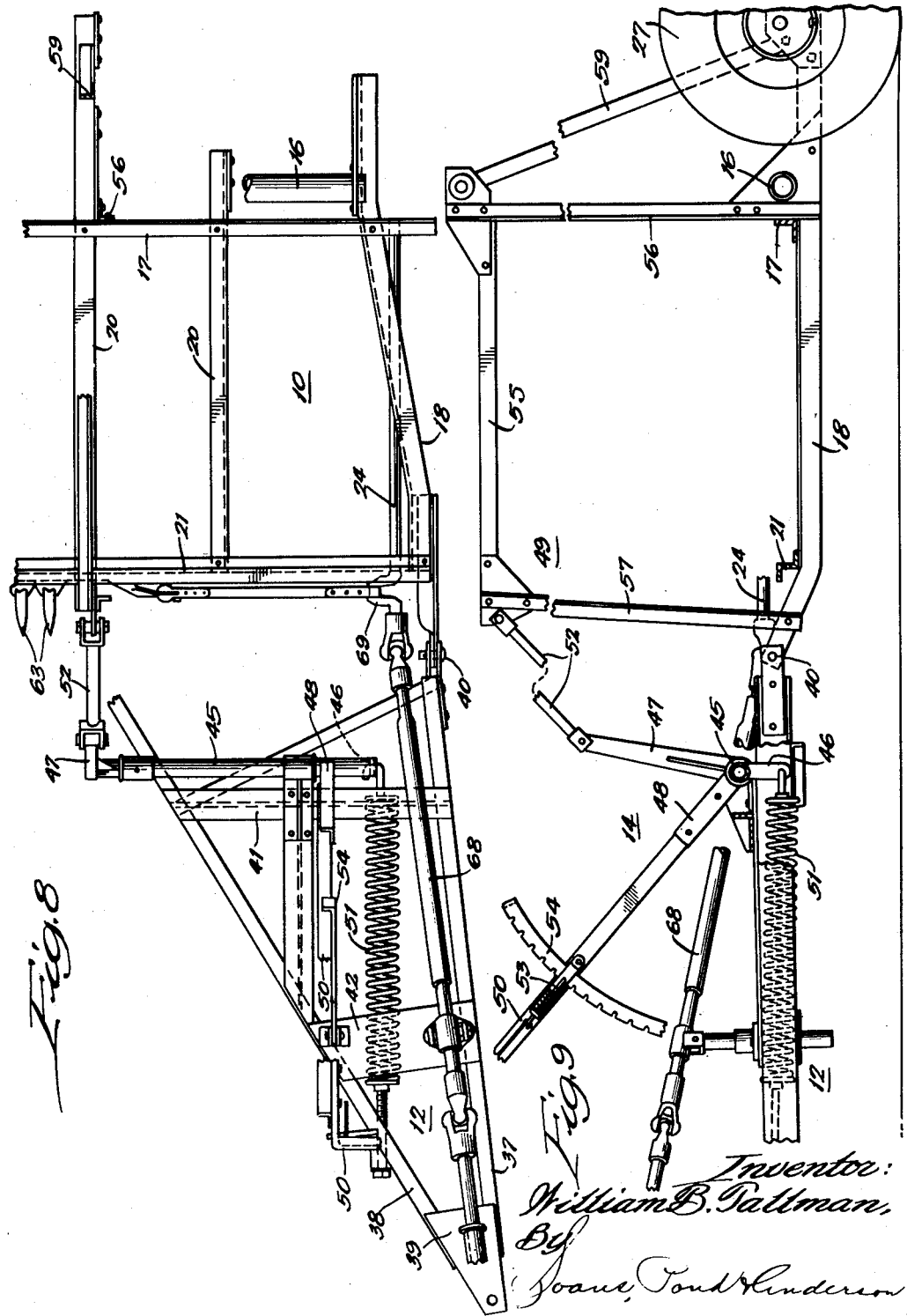

Patented Nov. 21, 1950

2,530,668

UNITED STATES PATENT OFFICE 2,530,668

WINDROWER LEVELING MEANS

William B. Tallman, Racine, Wis., assignor to J. I. Case Company, Racine, Wis., a corporation of Wisconsin Application June 14, 1946, Serial No. 676,823

2 Claims. (Cl. 56—209)

1

In the harvesting of grain by windrowers one of the first and foremost objectives is to cut as wide a swath as possible. However, it is important to so lay the swath of cut grain that it will be removed from the likelihood of being trampled during the cutting of subsequent swaths. Moreover, it is also desirable to lay the swath of grain on stubble not trampled during the cutting of a previous swath. In addition to this, the varying heights of grain to be harvested and the conditions of stand encountered require facilities for easily altering the height of the cutting mechanism from the ground. Windrowers capable of accomplishing all of these objectives present the further problem of transporting the machine from field to field.

The main objects of this invention, therefore, are to provide an improved construction of a harvesting machine, of the power-driven windrower type, which will permit the cutting of a swath of very considerable width; to provide improved means for insuring the laying of such a swath of cut grain on untrampled stubble and out of the path of any of the wheels of the machine during the cutting of subsequent swaths; to provide an improved construction and arrangement of means which will permit the easy and convenient adjustment of the cutting mechanism to accommodate the stand and condition of the grain; and to provide an improved construction of the windrower running gear permitting a quick and easy arrangement of the wheels for either field use or transport of the windrower, and vice versa.

A preferred embodiment of this invention is shown in the accompanying drawings wherein:

Fig. 5 is an enlarged, skeleton elevation of the supporting frame, with the running gear in transport position, as viewed from the inner end, with the conveyor auxiliary frame omitted;

2

Figure 1:
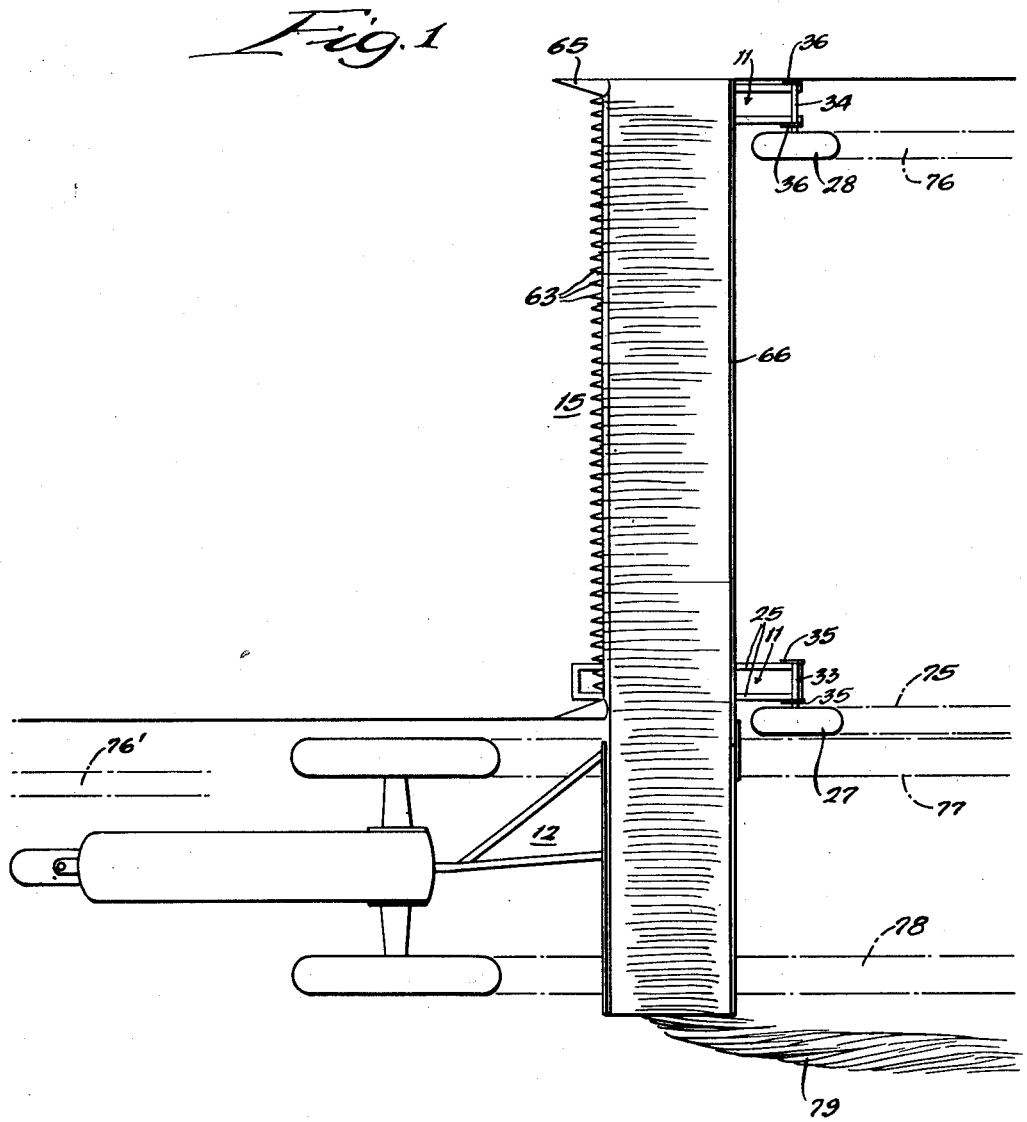
Fig. 1 is a diagrammatic plan view of a windrower, constructed in accordance with this invention, showing how the swath of cut grain is laid with respect to the various paths of trampled stubble made by the wheels of the tractor and windrower.

Fig. 6 is a plan view of the parts shown in Fig. 5 as viewed approximately from the plane of the line 6—6;

Fig. 7 is a plan view of the wheel support frame shown in Fig. 6 but with the wheel as attached for the use of the windrower on the field;

Fig. 8 is a plan view of the main draft bar and the associated leveling device by which the angularity of the grain-cutting mechanism to the horizontal is adjusted; and Fig. 9 is a side elevation of the same.

Because some parts of the structure and the mechanisms employed in this windrower are of a conventional nature, no attempt has been made to be equally exact and complete in the illustration of all parts of the machine. It is assumed that form and connections, where not clearly shown, will be readily understood either from their diagrammatic appearance in the drawings or from explanations hereinafter made.

A windrower constructed in accordance with this invention comprises a main frame 10 supported on a running gear 11 for either harvesting or for transport, depending upon whether a main draft bar 12 or an auxiliary draft bar 13 is connected to the tractor. A leveling mechanism 14 is mounted on the main draft bar 12 by means of which the grain-cutting and -conveying mechanism 15 is adjusted to accommodate varying stands of grain.

The main frame 10 comprises a pipe or tubular member 16 and a contiguous parallel angle bar 17, at the ends of which are secured transverse end members 18 and 19 and intermediate which are secured other transverse bars 20 (See Fig. 8), all of which support a forward angle frame member 21. Such a frame mounted on the running gear 11, as will appear more fully hereinafter, provides support for the cutting and conveying mechanism 15 and an auxiliary frame 22 by means of which the draper or conveyor belt 23 is extended beyond the near wheel of the tractor to which the windrower is attached by the main draft bar 12.

This auxiliary frame 22 comprises parallel front and back members connected by transverse elements and is swingably connected to the main frame 10, on an axis coincident with the axis of a drive shaft 24, forming a part of the operating means the general character of which will be set forth more fully hereinafter. Suitable means (not shown) are provided for adjusting the angularity of the auxiliary frame 22 with the main frame 10 so as to vary the distance at which a swath of grain falling from the end of the draper or conveyor 23 will be laid from the near-side tractor wheel.

The running gear 11 comprises a pair of wheel-support frames 25 and 26 on which are interchangeably mountable wheels 27 and 28. Both of the wheel-support frames 25 and 26, as herein shown, are formed of a pair of angle bars rigidly secured to the under side of the main frame 10. The spacing of each pair of these bars is identical. The wheel-support frame 25 extends forwardly and rearwardly of the main frame 10. The wheel-support frame 26 extends only rearwardly of the main frame 10. The wheel-support frame 25 has struts 29 and 30 connecting the respective ends of the angle bars and also has struts 31 and 32 secured thereto inwardly from the end struts a distance exactly equal to the spacing of the angle bars which form the frame 26.

Figure 2:
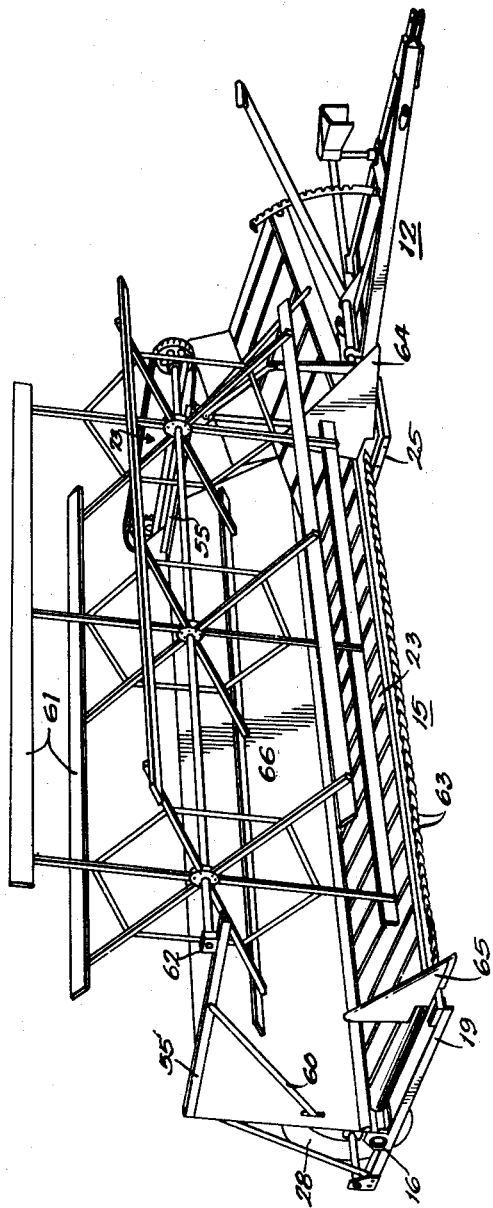
Fig. 2 is a perspective view of this improved windrower, detached from the tractor, with the various parts shown in their operative relationship for cutting grain.

The wheels 27 and 28 are journaled on shafts 33 and 34, respectively, to which are secured pairs of brackets 35 and 36. These brackets are spaced apart a distance equal to the distance between the outside faces of the angle bars which constitute these wheel-support frames 25 and 26. Thus the brackets permit the wheels to be attached interchangeably one to the rear end of each of the wheel-support frames 25 and 26, respectively, with the axes of the shafts alined longitudinally of the main frame 10 (as shown in Figs. 1, 2, and 7), or both to opposite ends of the wheel-support frame 25, with the shaft axes alined transversely of the main frame 10 (as shown in Figs. 3, 4, 5, and 6). As will also be observed from these figures, when the wheels are secured to the rear ends of the respective wheel-support frames 25 and 26, the pairs of brackets 35 and 36 are connected so that the shaft is above the wheel frames 25 and 26, whereas, when both of the wheels 27 and 28 are connected at opposite ends of the wheel-support frame 25, the brackets are positioned so that the shafts are below the wheel-support frame 25. Accordingly, when the wheels are in position for harvesting operation the main frame 10 is disposed closer to the ground than when the wheels are mounted for transporting the windrower from field to field. The higher spacing in the latter instance gives greater assurance of having the machine free of the irregularities in the terrain either on the field or the highway.

The main draft bar 12 comprises a pair of members 37 and 38 arranged in the form of a V. The apex ends of the members 37 and 38 are secured to plates 39 to which may be connected a clevis for attaching the draft bar to the tractor. The rear ends of the members 37 and 38 are hinged at 40 to upwardly-extending forward ends of the members 18 and 20. Braces 41 and 42 span the members 37 and 38, intermediate the ends, and provide support for the leveling mechanism 14, to be described presently. The hinging of the draft bar 12 permits it to be swung up out of its position for connection to a tractor, when the windrower is to be transported.

The auxiliary draft means 13, as herein shown, comprises a rod or bar 43 telescoping attached within the outer end of the pipe 16 and which may be held in place by a suitable pin extending through the pipe 16 and bar 43. At its outer end the bar 43 has secured thereto a pair of plates 44 to which a clevis may be connected for attaching the draft bar to the tractor. During operation, when the windrower is in the field use position, the draw bar 43 may be telescoped within the pipe 16 after the locking pin is removed.

The leveling mechanism 14 comprises a shaft 45 journaled on the main draft bar 12 and having angularly-arranged arms 46, 47, and 48 fixed to rotate therewith and respectively connected to the draft bar 12, a reel-supporting frame 49, and a control lever 50. As is shown in Figure 9, the arm 46 extends substantially vertically downwardly when the control lever 50, which is operatively connected to arm 48, is disposed in an intermediate position with respect to the notched segment 54. The arm 46 is proportioned so as not to extend substantially below the draft bar 12, and the connecting arm 47 extends substantially vertically upwardly thereby being generally vertically alined with arm 46. The arm 48, which is connected with the control lever 50, extends upwardly and forwardly from shaft 45. The arms 46, 47, and 48 are transversely offset with respect to one another on the shaft 45, as is shown in Figure 8. The connection of the arm 46 to the draft bar 12 is by a spring 51. This spring is so tensioned that it counterbalances the weight of the machine, through the connection of the arm 47 to the reel-supporting frame 49 by the link 52, as the level of the grain-cutting and -conveying mechanism 15 is adjusted by the shifting of the lever 50 connected to the arm 48. As shown in Figure 9, the link 52 extends rearwardly and upwardly from the upper portion of connecting arm 47 to the reel supporting frame 49. The operating lever 50 is provided with the usual spring-actuated pawl 53 adapted to engage the notched segment 54 for locating the lever in any desired position to temporarily fix the angularity of the grain-cutting and -conveying mechanism relative to the horizontal.

Figure 3:
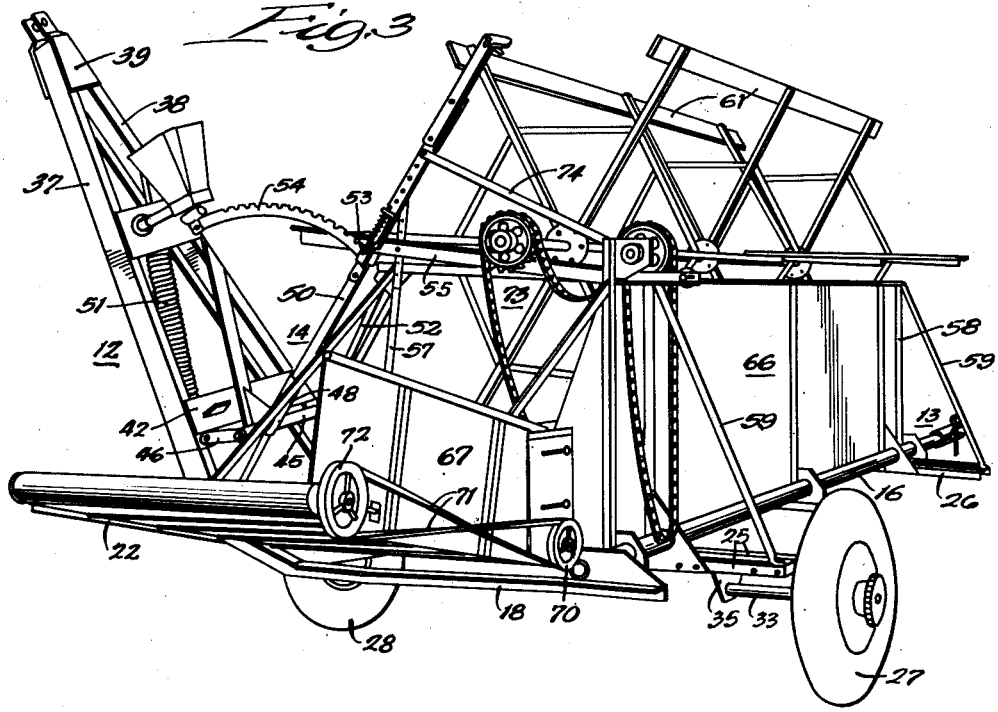
Fig. 3 is a rear perspective view of such an improved windrower, the various parts being shown in their relatively retracted positions which they occupy during the transport of the windrower from field to field.

The reel-supporting frame 49 comprises a pair of horizontal end bars 55 and 55′, the former supported at the inner end of the main frame 10 by vertical bars 56 and 57 and the latter supported at the outer end of the main frame 10 by a vertical bar 58 (see Fig. 3). This mounting of the reel-supporting frame 49 on the main frame 10 is reinforced by braces 59 and 60. A reel 61 is mounted in bearings 62 which are shiftable along the bars 55 and 55′ to properly accommodate the reel to harvesting or transport conditions of the machine, as variously illustrated in Figs. 2, 3, and 4.

The grain-cutting and -conveying mechanism 15 is of a more or less conventional character comprising a sickle bar (not shown) mounted in a guard 63 secured along the forward or advancing edge of the main frame 10. Rearwardly of this is arranged the conventional draper or conveyor 23 extending around the usual end rollers, journaled at the outer end of the main frame 10 and the outer end of the auxiliary frame 22 respectively and supported by intermediate idler rollers (not shown).

The windrower is provided with the usual dividers 64 and 65 and a wind-shield 66. An auxiliary wind-shield 67 is mounted along the rear of the auxiliary frame 22 (see Fig. 3).

The operating means for the grain-cutting and -conveying mechanism 15 and the reel 61 includes the shaft 24 journaled on the under side of the inner end of the main frame 10 and connected through a shaft 68, mounted on the draft bar 12, to the tractor. Adjacent to its inner end the shaft 24 is provided with a crank 69 which, through a pitman (not shown), is connected to operate the sickle bar (not shown). The outer end of the shaft 24 extends beyond the main and auxiliary frames 10 and 22 and mounts a pulley 70 connected by means of a crossed belt 71 to a pulley 72 on the end roller (not shown) on the auxiliary frame 22 around which the draper or conveyor belt 23 travels.

Suitable gear and sprocket means 73 (see Fig. 3) operatively connects the reel with the wheel 27 when said wheel is attached to the wheel-support frame 25 for harvesting operation (see Figs. 1, 2, and 7). When the reel 61 is retracted, the sprocket chain, of the aforesaid gear and sprocket means 73, is draped over the sprockets as shown in Fig. 3. This retraction of the reel 61, to accommodate the transport of the machine, permits the main draft bar 12 to be held in its upwardly-disposed retracted position by means of a link 74 (see Fig. 3) connecting the operating lever 50 to an appropriate part of the reel-supporting frame 40.

The swath-laying advantages of this windrower construction will be most apparent from Fig. 1. The transport advantages will be readily discerned from Figs. 3 and 4.

Fig. 1 outlines the windrower and tractor cutting a swath of grain. The stubble trampled by the windrower wheels 27 and 28 is indicated by the pairs of dotted lines 75 and 76. The stubble trampled by the wheels of the tractor is indicated by the pairs of dotted lines 77 and 78. The swath of grain 79 is laid on untrampled stubble a few inches to the left of the path 78 of the "near" tractor wheel. This is completely out of the paths 75', 76', and 77' formed by the harvester wheels 27 and 28 and the "far" tractor wheel in the cutting of the previous swath of grain. Likewise it is clearly obvious that the swath of grain 79 is entirely removed from the paths of all of these wheels during the cutting of a subsequent swath.

The exact distance which the swath is laid from the path 78 of the "near" tractor wheel may be altered, if occasion requires, by adjusting the angularity of the auxiliary frame 22 to the main frame 10.

Figure 4:
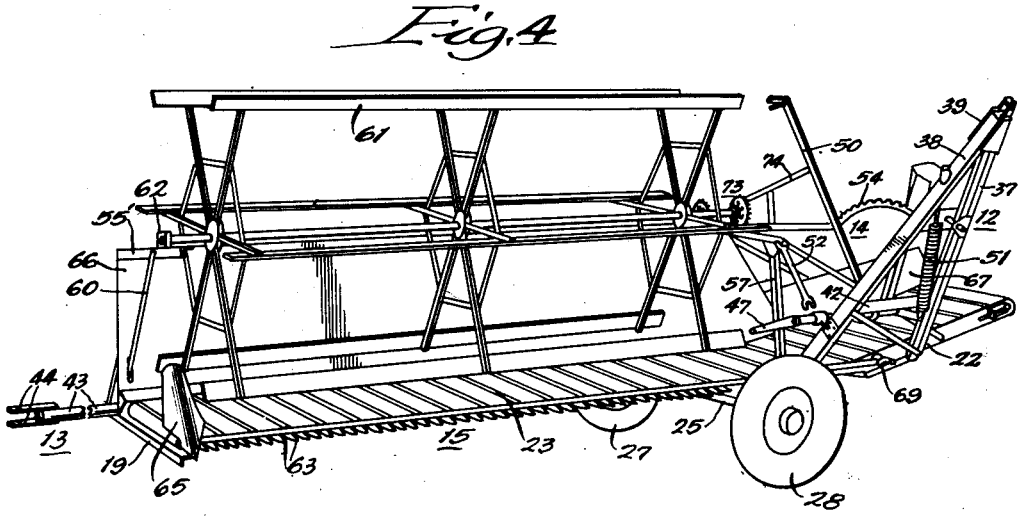
Fig. 4 is a front perspective of the same.

The rear and front views of Figs. 3 and 4 clearly show the positioning of all the parts of the harvester when it is to be transported from field to field.

Variations and modifications of the details of structure and arrangement of the parts herein shown and described may be resorted to within the spirit and coverage of the appended claims.

I claim:

1. In a windrower having an elongated main frame, a cutter bar and sickle disposed on said main frame adjacent the forward edge thereof, a vertically extending, grain-reel-supporting-frame rigidly attached to said main frame, a draft bar pivotally attached to the forward edge of said main frame, a pair of spaced apart support wheels attached to the rearward portion of said main frame, and a leveling mechanism, the improvement which comprises providing a leveling mechanism including a rotatably supported shaft adapted to be connected to said draft bar, a plurality of arms which are rigidly attached to said shaft and which are adapted to rotate therewith, said arms including a downwardly extending arm, a forwardly and upwardly extending control lever, and an upwardly extending connecting arm which is in substantial vertical alignment with said downwardly extending arm, a spring which is connected at one end to the lower end of said downwardly extending arm and which is adapted to be connected at its other end to a portion of said draft bar which is forward of said shaft, locking means operative to selectively lock said control lever in a predetermined position, and a connecting link which is hingedly attached at one end to the upper end of said connecting arm and which is adapted to be connected at its other end to the upper portion of said vertically extending, grain-reel-supporting frame, said connecting link extending upwardly and rearwardly from said connecting arm to said vertically extending, grain-reel-supporting frame.

2. In a windrower having an elongated main frame, a cutter bar and sickle disposed on said main frame adjacent the forward edge thereof, a vertically extending frame rigidly attached to said main frame, a draft bar pivotally attached to the forward edge of said main frame, a pair of spaced apart support wheels attached to the rearward portion of said main frame, and a leveling mechanism, the improvement which comprises providing a leveling mechanism which includes a rotatably supported shaft adapted to be connected to said draft bar, a plurality of radially extending arms which are attached to said shaft for rotation therewith, said arms including a spring engaging arm, a forwardly and upwardly extending control lever, and an upwardly extending connecting arm, a spring which is connected to said spring engaging arm and which biases said connecting arm rearwardly, locking means operable to selectively lock said control lever in a predetermined position, and a rearwardly and upwardly extending connecting link which is hingedly attached at one end to said connecting arm and which is adapted to be connected at its other end to said vertically extending frame.

WILLIAM B. TALLMAN.

REFERENCES CITED

The following references are of record in the file of this patent:

UNITED STATES PATENTS

| Number | Name | Date |
|---|---|---|
| 943,090 | MacPhail | Dec. 14, 1909 |
| 1,312,388 | Converse | Aug. 5, 1919 |
| 2,281,059 | Anderson et al. | Apr. 28, 1942 |
| 2,352,479 | Huddle | June 27, 1944 |